Aug. 30, 1966  W. J. BENNETT  3,269,574
THRIFTY CAMPER LIFT ASSEMBLY
Filed Aug. 19, 1964  2 Sheets-Sheet 1

INVENTOR.
Winton J. Bennett

Aug. 30, 1966  W. J. BENNETT  3,269,574
THRIFTY CAMPER LIFT ASSEMBLY
Filed Aug. 19, 1964  2 Sheets-Sheet 2
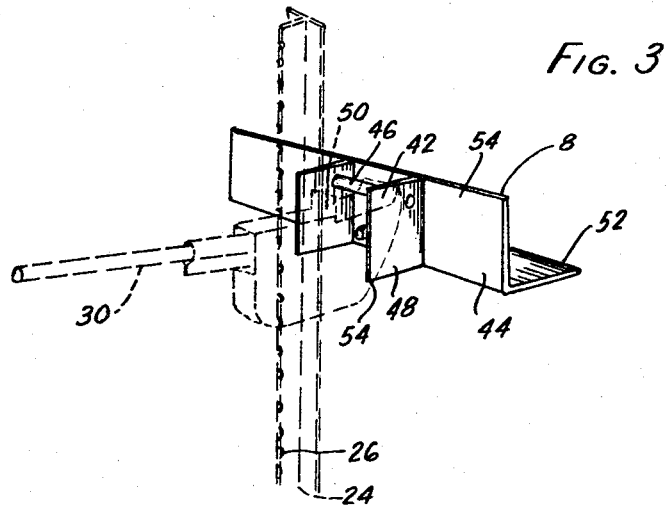
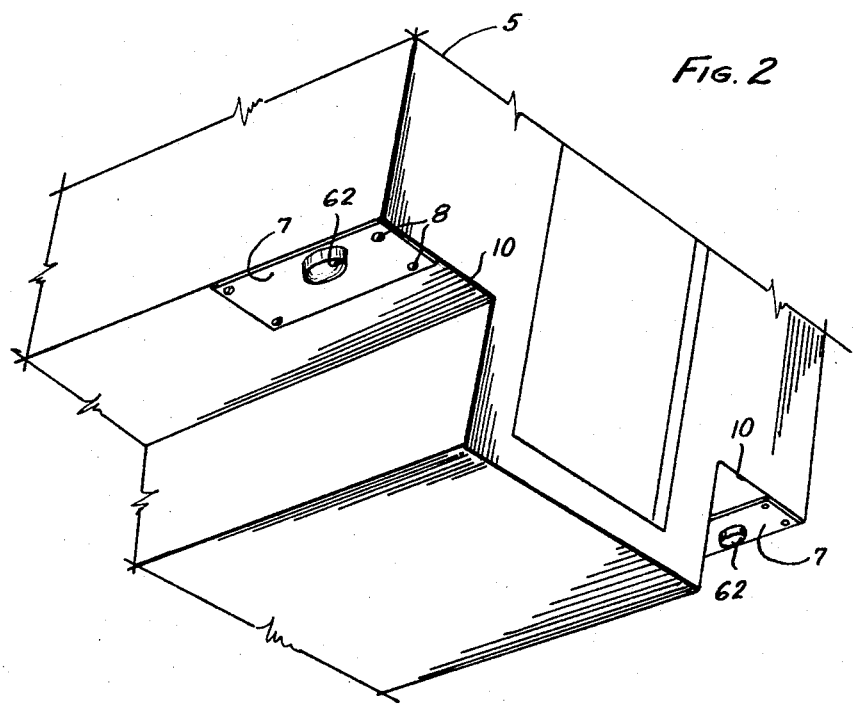
INVENTOR.
Winton J. Bennett

United States Patent Office 3,269,574
Patented August 30, 1966

3,269,574
THRIFTY CAMPER LIFT ASSEMBLY
Winton J. Bennett, Box 213, Tensleep, Wyo.
Filed Aug. 19, 1964, Ser. No. 390,764
1 Claim. (Cl. 214—515)

This invention relates to both the method and apparatus for mounting coach bodies and the like, and particularly for mounting and de-mounting such bodies for transporting vehicles as for example, pickup trucks and the like.

It has become a common practice to mount coach bodies on the beds of small trucks such as pickup trucks, and the present invention relates to means for selectively raising such bodies during de-mounting of the bodies from the truck. In accordance with the present invention, there are provided a number of readily operable lifting means which are adapted to raise the coach body, or camper body, and hold such body in whatever vertical position is desired, said body is then thereafter raised or lowered as desired, independently of the transportation vehicle. In this way, the pickup truck can be used for other purposes than transporting the coach body and conversely, the coach body being stationarily mounted can be located permanently or semi-permanently in whatever location is desired and in a selected raised position.

It is one of the foremost objects of the present invention to provide a novel lift means whereby the coach can be readily raised and lowered by means of a novel procedure whereby first one, and then the other side of the coach body is raised, transferring such support load from the transport vehicle onto the jacks.

It is further object of the present invention to provide a novel lifting mechanism which incorporates a readily available jack which is standard equipment in most vehicles for tire changing operations and which can be used in raising and lowering the coach bodies.

It is a further object of the present invention to provide a novel raising and lowering apparatus which can safely effect such raising and lowering and is capable of vertically supporting such coach with a sufficient degree of stability and safety.

It is an important feature of the present invention that the lifting mechanism can utilize a conventional bumper jack which is incorporated into the lifting mechanism for use therewith.

Other objects and features of the present invention will become apparent from a consideration of the following description which proceeds with reference to the accompanying drawings, wherein:

FIGURE 2 is a perspective view of the coach or camper body viewed from its undersurface and showing the adapters mounted at two of the corners and which are affixed to the bottom of the corners;

FIGURE 3 is a perspective view showing the bumper jack adapter in full line and in combination with the bumper jack which is shown in dashed lines.

Figure 1:
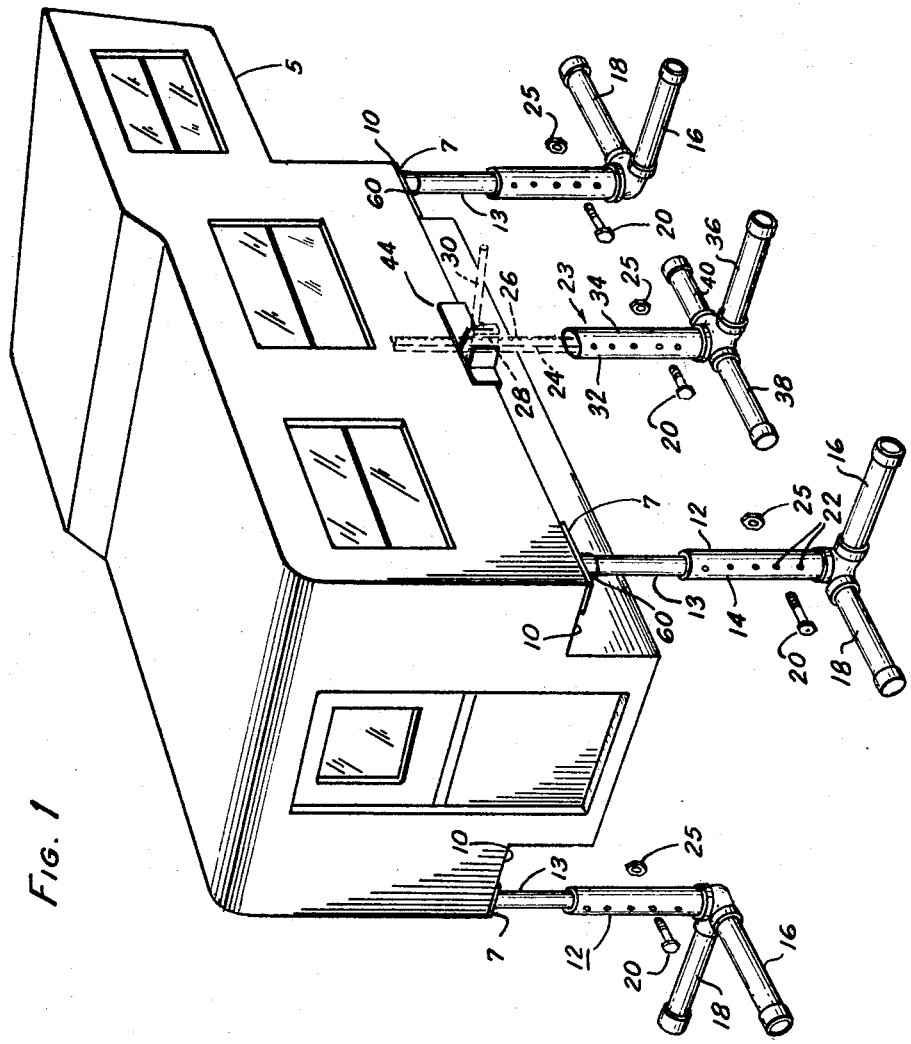
FIGURE 1 is a perspective view of a coach body supported in a manner taught by the present invention and incorporating the lifting mechanism.

Referring now to the drawings, and particularly to FIGURE 1, a coach body or camper body designated generally by reference numeral 5 has at four of its corners, adapters 7 (FIGURE 2) which are bolted or otherwise suitably secured by screws or the like 8 to undersurface corners 10. These adapters are disposed at each of four corners of the coach in order to vertically support the coach at each corner and thereby provide a stable support condition. Each adapter 7 has a coacting support 12 consisting of a vertically adjustable post 13 which is telescopically received within an upright stanchion 14 having transverse legs 16 and 18 which provide ground support for the stanchion. The post 13 is held in whatever vertical position is desired by means of a pin 20 which passes through a selected one of openings 22 and is held in such position by a nut 25. The legs 16 and 18 on a respective one of the four supports are positioned so that all of the respective legs 16 and 18 extend away from the coach body and thereby as a whole they support and prevent slipping or tripping of the coach about the respective supports.

The weight of the coach is transferred from the transport vehicle onto the support by means of a lift mechanism designated generally by reference numeral 23 and consisting of a jack 24 having a number of spaced teeth 26 (that form a rack) pawl 28 which is operated by the handle 30 adapted to cause the lift to move vertically upwardly or downwardly in a conventional jacking action, depending upon the position of the pawl 28. The jack has a bottom portion 32 which is supported by a pedestal by being received within tubular stanchion 34 which is supported at its base by three feet or legs 36, 38 and 40 which are disposed as a T so that stability can be provided in supporting the weight of the coach at its side and without tipping or causing the coach to move uniformly after it is raised vertically.

The jack moves a toe 42 which has mounted thereon an adapter 44, the adapter 44 has a pin 46 which extends between plates 48 and 50 (attached to a vertical flange 53) and which rests on the toe 42 so that the weight sustained by a horizontal flange 52 will tend to cause the adapter 44 to turn about the pin 46. Such turning is resisted by engagement of the vertical flange 53 with the undersurface 54 of the toe. Consequently, the adapter can be slipped onto the toe of the jack and it will hold this position while supporting the weight of the coach body. The length and width of the flange 52 are such that ample bearing support is effected between the adapter and the jack and the chance of slippage is minimized. At the same time the connection between the jack and the adapter has considerable security so that they will not detach once the jack has taken the load of the coach body. The flange 53 prevents the adapter from moving inwardly thus producing a more positive connection with the coach and at the same time the combination of flanges 52 and 53 produces a stable and effective means for transmitting lifting action of the jack to the coach body thereafter holding the coach body in vertical position without tipping or loss of load.

When it is desired to detach the adapter, the jack is simply lowered until the weight is transferred onto the corner supports and the adapter can be readily lifted off of the toe of the jack, there being no locking means required for securing the two parts together.

In operation, when it is desired to lift the coach from the tow vehicle, the two corner supports at one side of the coach body are disposed in place and the lift posts 13 thereof are raised. The lifting mechanism 23 is then located in position with the adapter 44 on the toe of the jack and the jack fitted within stanchion 34 at a suitable height determined by the pin 20 and nut 25. The handle 30 is then operated causing the adapter flange 52 to raise the one side of the coach body. The posts 13 are then raised until their upper ends 60 are in engagement with coacting surfaces 62 (FIGURE 2) and the pawl of the jack is then reversed and the handle 30 is again operated to lower the jack and the weight is transferred from the jack onto the two corner supports at the one side of the coach body.

The process is then repeated for the other side of the coach body and the weight of the coach body is thus transferred entirely from the vehicle onto the four corner supports by first raising one side and then the other side of the coach through the lifting mechanism 23. Care is, of course, taken that the one side is not raised substantially ahead of the other to create likelihood of slippage. Note that the jack can be located at the center of gravity, or close to the center of gravity along one side of the coach body, by using a locating opening or other suitable locating means between the coach body and flanges 52, 53 so that the proper position of the jack in relation to the coach body can be determined. Also, once the weight of the coach body is transferred onto the corner supports, the corner supports will be reliably secured by means of half round fillets thus making a positive connection between the post 13 and the undersurface of the corner adapters 7.

The ends 60 of the posts 13 may be threaded to connect to internally threaded openings 62 of the corner adapters 7.

The present invention incorporates as a part of the lifting mechanism, a jack which is readily available and its use makes it possible, with a substantially reduced number of additional parts, to provide the means for transferring the load of the coach body from a transport vehicle onto ground supported parts; and, conversely, the invention makes possible a retransferral from the ground onto a support vehicle. In this way, greater utility may be obtained from the transport vehicle and also the coach body is itself made more useable.

Although the present invention has been described in connection with a single example embodiment, it will be understood that this is illustrative of the invention and is by no means restrictive thereof. It is reasonably to be expected that those skilled in this art can make numerous revisions and adaptations of the invention, and it is intended that such revisions and adaptations will be included within the scope of the following claim as equivalents of the invention.

I claim:

The combination of a coach body and lifting apparatus for mounting and de-mounting said coach body from the bed of a transport vehicle, comprising:

(a) a pedestal having spaced apart feet adapted for carrying a vertical load without tipping or bending;

(b) a jack having a shaft received on said pedestal and including a plurality of spaced notches therein to form a rack, pawl means operatively combined with said spaced notches to effect upward and downward movements, and a toe connected to said jack and disposed toward said coach body to be lifted;

(c) adapter means including angular means having a horizontal flange and a vertical flange which receive the edge of said coach body near its center of gravity for lifting thereof, a pin fastened to said vertical flange and received on said toe to provide a pivotal support of said adapter means, whereby said adapter means tend to pivot downwardly and away from the supported coach body;

(d) means including said vertical flange to form an abutment between said adapter means and said jack to limit such pivotal movement and thereby provide vertical support for said coach body by said toe of said jack and said adapter means;

(e) and means for vertically adjusting said jack shaft on said pedestal.

References Cited by the Examiner

UNITED STATES PATENTS

| | | | |
|---|---|---|---|
| 2,544,504 | 3/1951 | Keys | 248—188.8 X |
| 2,549,996 | 4/1951 | Walsh | 254—134 |
| 2,646,957 | 7/1953 | Lovik | 254—45 X |
| 2,995,397 | 8/1961 | Eames | 214—515 X |
| 3,074,576 | 1/1963 | Peterson | 214—515 |
| 3,110,475 | 11/1963 | Achterberg | 254—109 X |
| 3,155,373 | 11/1964 | Rae | 254—45 |
| 3,164,371 | 1/1965 | Royle | 214—515 X |
| 3,186,570 | 6/1965 | Bunnell | 214—515 |

FOREIGN PATENTS 764,892  1/1957  Great Britain.

GERALD M. FORLENZA, *Primary Examiner.*

A. J. MAKAY, *Assistant Examiner.*